(12) United States Patent
Mosher

(10) Patent No.: US 8,627,277 B2
(45) Date of Patent: Jan. 7, 2014

(54) MACHINE DRIVEN PROCESS FOR USER INTERFACE DRIVEN DATA MODELING COLLABORATION

(75) Inventor: Barry Courtenay Mosher, North Saanich (CA)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 11/965,286

(22) Filed: Dec. 27, 2007

(65) Prior Publication Data

US 2009/0172566 A1    Jul. 2, 2009

(51) Int. Cl.
*G06F 9/44* (2006.01)

(52) U.S. Cl.
USPC ............ 717/109; 717/104; 717/105; 715/762

(58) Field of Classification Search
USPC .......................................................... 717/109
See application file for complete search history.

(56) References Cited

U.S. PATENT DOCUMENTS

| | | | |
|---|---|---|---|
| 2004/0227776 A1* | 11/2004 | Bent et al. | 345/700 |
| 2005/0071749 A1* | 3/2005 | Goerke et al. | 715/501.1 |
| 2005/0289450 A1* | 12/2005 | Bent et al. | 715/506 |
| 2006/0259868 A1* | 11/2006 | Hirschberg et al. | 715/762 |
| 2008/0104540 A1* | 5/2008 | Sawyer | 715/809 |
| 2009/0083697 A1* | 3/2009 | Zhang et al. | 717/105 |

* cited by examiner

*Primary Examiner* — Li B Zhen
*Assistant Examiner* — V Miller
(74) *Attorney, Agent, or Firm* — Yee & Associates, P.C.; Yeen Tham

(57) ABSTRACT

A computer implemented method and computer program product build a data-bound user interface. An instruction from a graphical designer is received for creating the presentation field within the presentation user interface. When the presentation field is created, a corresponding data element is created within a reserved data model, and the presentation field is automatically bound to the data element. Instructions from a data modeler are received for relocating the data element from within the reserved data model to within a custom data model. The data element is relocated to the custom model, and the binding from the presentation field to the data element is maintained. The data bound user interface is then built, including the presentation field and the data element.

18 Claims, 5 Drawing Sheets

MACHINE DRIVEN PROCESS FOR USER INTERFACE DRIVEN DATA MODELING COLLABORATION

BACKGROUND OF THE INVENTION

1. Field of the Invention

The present invention relates generally to an improved data processing system, and in particular to a computer implemented method, computer usable program product, and apparatus. Still more particularly, the present invention relates to a computer implemented method, apparatus, and computer usable program product for a machine driven process for user interface driven data modeling collaboration.

2. Description of the Related Art

Building data-bound user interfaces for desktop interfaces, web applications, and electronic forms, involves two conceptually different types of tasks: graphical design of the user interfaces and data modeling of the data underlying the user interface. Indeed, at most organizations, the two tasks are completed by different people taking on the roles of a graphical designer and a data modeler. A major difficulty arrives from the interaction of these different people in those roles when creating a new application or when maintaining new iterations of an existing application.

The graphical designer is concerned with the design and layout of the user interface in terms of placement of items like labels, fields, buttons, graphics, and other presentation type items. According to business needs, the design and layout of the user interface should be easy to work with, easy to understand, and provide an aesthetically pleasing appearance. Because the visual design of the user interface is both a showcase of the organization to business analysts, and the primary vehicle for access to the organization for users, the presentation of the user interface is of paramount importance to most organizations. The design and layout for the presentation of the user interface is usually prototyped, reviewed, and updated many times before a final appearance is established.

While the graphical designer is busy going through each iteration of the design and layout of the user interface, data modeling is required for each iteration to make the application actually work. Data modeling includes the design of the underlying data model according to business needs. Data models must ensure compatibility with external systems, standards, and technical requirements. The data model may need to conform to and work with XML schemas, XSD schemas, WSDL, SOA, and databases. Data models must also "bind" the presentation of the user interface to data model. Binding the user interface indicates where values that are entered by a user in the presentation are stored in the data model. Binding the user interface indicates where the presentation gets data to display.

Development of a data-bound user interface is typically an iterative process, with both the graphical designer and data modeler doing work on each iteration of the user interface. Changes made to the user interface by the graphical designer can often break or corrupt previous work done by the data modeler. Ideally, the graphical designer would never have to edit the data model, or even be aware of it. However, because the presentation must be "bound" to the data model in a completed application, changes made to presentation do in fact affect the binding.

In an attempt to overcome the problem described, some systems enforce that all presentation items are bound to a data model. Such a solution is not desirable as it requires a single user to simultaneously perform both the role of graphical designer and data modeler. Furthermore, systems enforcing that all presentation items are bound to a data model also suffer from other problems. These systems either do not protect the data model from alteration when modifying the presentation, or they do not allow the user interface design to influence the model design at all. Such systems are constrained by the model, i.e., model-driven design, instead of allowing the user interface to dictate the underlying model, i.e., UI-driven modeling.

Organizations have also attempted human-managed approaches to solving the problem of graphical designers breaking the binding between the presentation and the data model. One approach is simply to assign one person to perform both the role of graphical designer and the role of data modeler. However, qualified people possessing both these skill sets are very difficult to find. Furthermore, even when one person is fulfilling both roles, they are generally forced to perform one role at a time. It is helpful that when they modify the presentation, they understand what work they are creating for themselves to fix as the data modeler. Attempting to fill both roles at the same time is difficult.

Another approach is for the graphical designer to be made partially aware of the data model. When the graphical designer knows of potential impacts on the data model, the graphical designer can be tasked with creating a list of any changes they make to the presentation that might impact binding to the data model. Any fields, labels, or buttons within the user interface that are added, removed, or renamed can then be included in the list. When the graphical designer is done with their work, the list is given to the data modeler. The data modeler can then make any necessary corrections. However, this approach is only a partial solution. The application is generally in a broken or non-working state after the graphical designer has made modifications. The graphical designer therefore cannot successful test or preview the application until the data modeler fixes the binding. Thus, this approach may force many more iterations and hand-offs between the two roles than is desired.

SUMMARY OF THE INVENTION

A computer implemented method and computer program product build a data-bound user interface. An instruction from a graphical designer is received for creating the presentation field within the presentation user interface. When the presentation field is created, a corresponding data element is created within a reserved data model, and the presentation field is automatically bound to the data element. Instructions from a data modeler are received for relocating the data element from within the reserved data model to within a custom data model. The data element is relocated to the custom model, and the binding from the presentation field to the data element is maintained. The data bound user interface is then built, including the presentation field and the data element.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
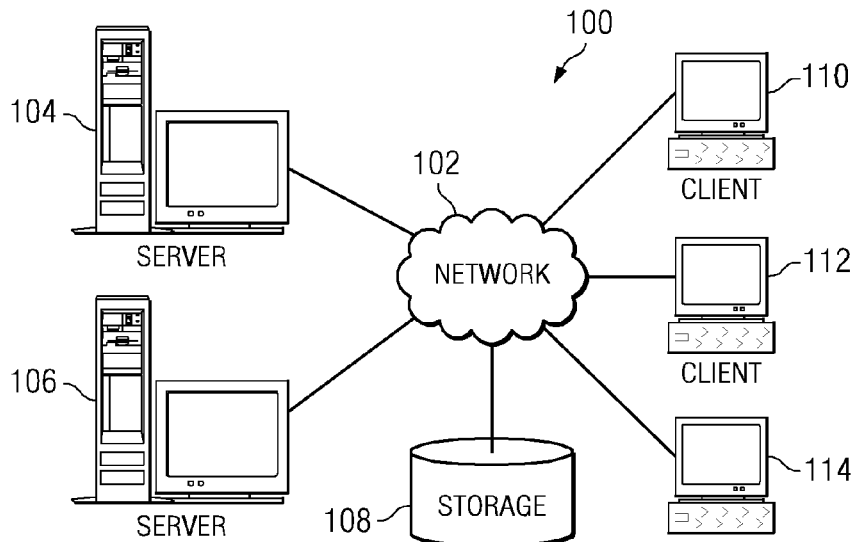
FIG. 1 is a pictorial representation of a network of data processing systems in which illustrative embodiments may be implemented.
Figure 2:
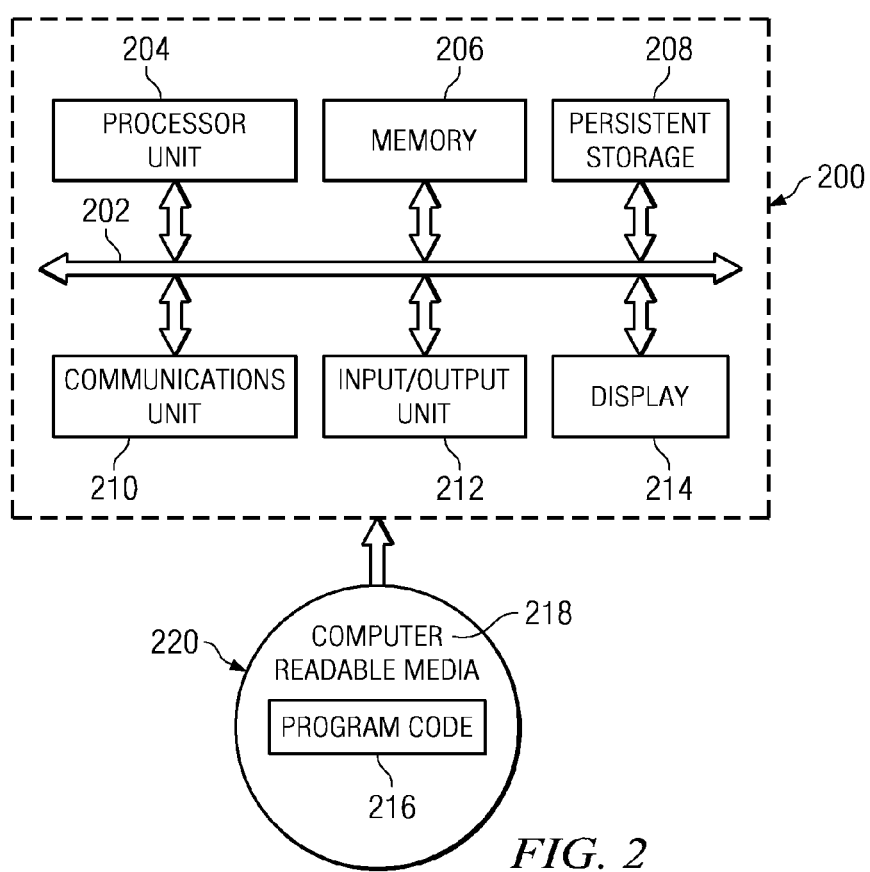
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In the illustrative embodiments, a data modeler, and a graphical designer can use 110, 112, and 114 to access the user interface builder. The user interface builder can be stored remotely on server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrated embodiments describe a process for automatically generating and synchronizing a data model and its binding to the application's presentation, while allowing both the graphical designer and the data modeler to work on the application in iterations. The graphical designer and the data modeler are able to work on the application without negatively impacting each other's work. The illustrated embodiments enable a user interface driven data modeling collaboration between the graphical designer and the data modeler.

A reserved data model is automatically generated and synchronized. The reserved data model is managed separately from the custom data model generated by the data modeler. The data modeler is not permitted to directly edit the reserved data model. The reserved data model is automatically generated by the data processing system simultaneously with graphical design, to ensure that it is always complete and kept synchronized with the presentation of the user interface.

The binding of the presentation to the reserved data model is also automatically generated by the data processing system simultaneously with graphical design. This automatic binding enforces the rule that all presentation items are bound to the data model. The data modeler is able to build the rest of the data model as desired or required, and changes the presentations to be bound to the custom model instead of the automatically generated reserved model. As the data modeler changes the presentations to be bound to the custom model, elements of the automatically generated reserved model are removed as part of the synchronization. The reserved model generation and synchronization processes therefore never impact the custom model or the binding of presentation items to it.

Beyond the mere automatic generation of the reserved model, the illustrative embodiments offer advantages over the human-managed approach of the prior art. In addition to keeping track of binding impacts in the data model due to changes by the graphical designer, the process also ensures that a complete working data model is always available. Furthermore, presentation of the user interface is always fully bound to the working data model. The graphical designer can preview and test the application at any time without waiting for updates and completion from the data modeler.

Furthermore, implementation by the data modeler is no longer invalidated due to changes in the project by the graphical designer. The data modeler is provided with an automatically generated reserved data model that matches both in terms of the number of elements within the user interface, and the names of the elements within the user interface. This generated, reserved model can then be used as the starting point for building the exact model desired by the data modeler.

Finally, the data modeler is informed of changes made by the graphical designer. The list of changes is complete and accurate, and is reflected in updates to the data model and binding. Therefore, much of the revisions that the data modeler must implement in response to changes by the graphical designer are performed automatically.

Figure 3:
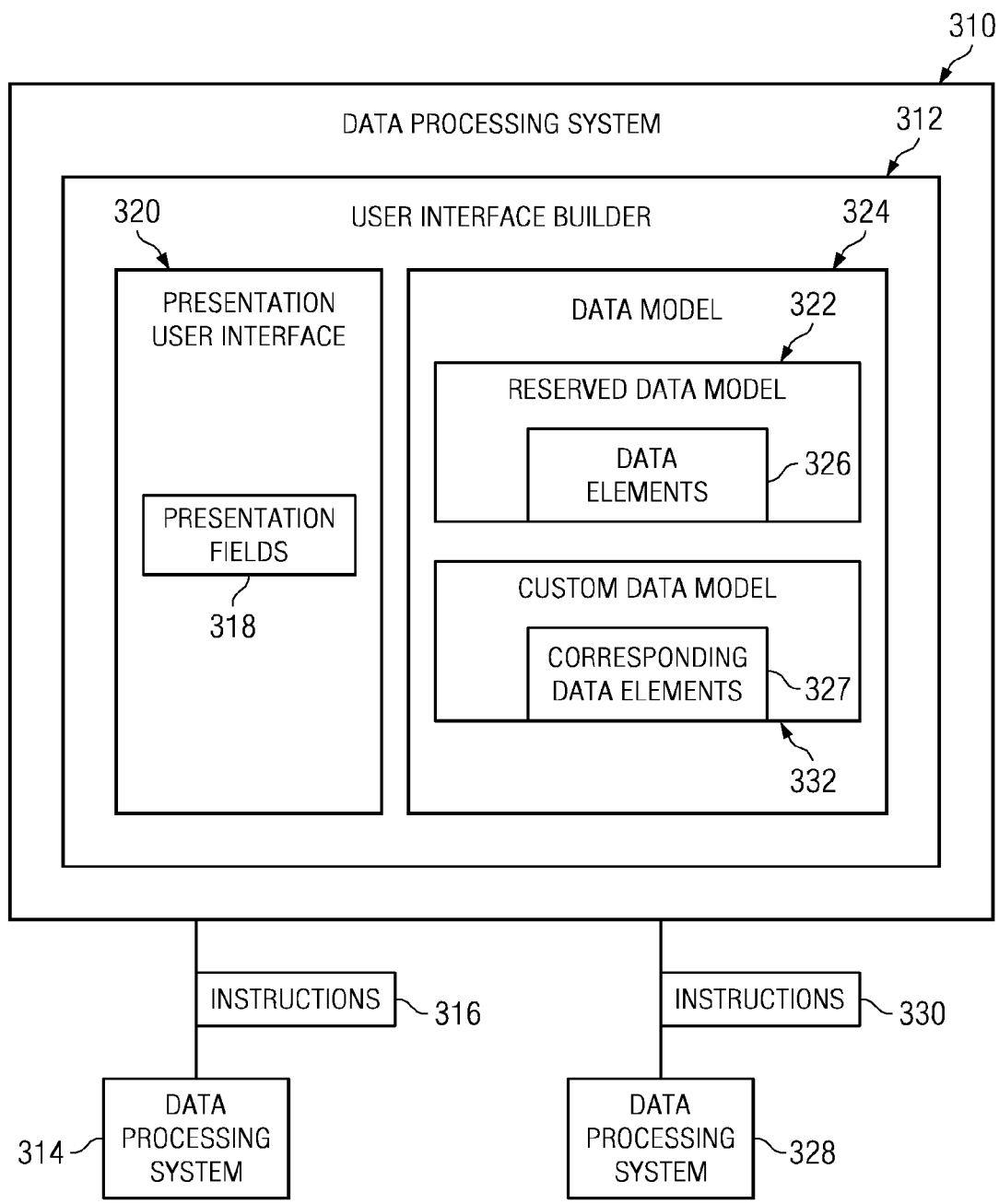
FIG. 3 is a data flow diagram depicting the flow of data between various components according to an illustrative embodiment.

Referring now to FIG. 3, a data flow diagram depicting the flow of data between various components is shown according to an illustrative embodiment. The process works by reserving part of the data model for a machine managed generation and modification.

User interface builder 312 executes on data processing system 310. User interface builder 312 is a software component that allows developers, including graphical designers and data modelers, to develop data-bound user interfaces for desktop interfaces, web applications, and electronic forms. Data processing system 310 can be data processing system 200 of FIG. 2.

A graphical designer uses data processing system 314 to access user interface builder 312. Data processing system 314 can be a client, such as clients 110, 112, and 114 of FIG. 1. The graphical designer sends instructions 316 to user interface builder 312. Instructions 316 are computer instructions, or program code, to manipulate the user interface that is being built.

Responsive to receiving instructions 316, user interface builder 312 performs the instructions, placing or removing appropriate presentation fields 318 within the design and layout of the presentation user interface 320. Presentation fields 318 are labels, fields, buttons, graphic designs, and other presentation type items, as well as the layout of those items, placed within presentation user interface 320. Presentation user interface 320 is the design and layout of the user interface which is seen when executing the data-bound user interface.

Responsive to presentation fields 318 being placed within presentation user interface 320, user interface builder 312 generates and synchronizes reserved data model 322 within the data model 324. Reserved data model 322 is a functional data model that is generated by user interface builder 312. User interface builder 312 creates data elements 326 within reserved data model 322. User interface builder 312 binds data elements 326 to the appropriate presentation fields 318 within presentation user interface 320. By binding data elements 326 to appropriate presentation fields 318, user interface builder 312 provides a reference from appropriate presentation fields 318 to data elements 326. The binding of data elements specifies from where presentation fields 318 retrieves data, and to where presentation fields 318 should store any data input from the user.

Thus, as the graphical designer adds presentation fields 318, reserved data model 322 is automatically generated and maintained. Reserved data model 322 is generated in real time as the graphical designer works with user interface builder 312.

A data modeler uses data processing system 328 to access user interface builder 312. Data processing system 328 can be a client, such as clients 110, 112, and 114 of FIG. 1. The data modeler sends instructions 330 to user interface builder 312. Instructions 330 are computer instructions, or program code, to manipulate data model 324 and data elements 326 therein.

By receiving instructions 330, user interface builder 312 enables the data modeler to build the rest of data model 324 as desired or required, and to make changes to data model 324. As changes are made to data model 324, user interface builder 312 removes data elements 326 being acted upon by the data modeler from reserved data model 322. Thus, the data modeler places corresponding data elements 327 into custom data model 324. The data modeler can then relocate the binding between presentation fields 318 and data elements 326, with a binding between presentation fields 318 and corresponding data elements 327 in custom data model 332 within data model 324. Custom data model 332 is a functional data model containing data elements that have been manipulated by the data modeler.

As the data modeler relocates the bindings of data elements from data elements 326 of reserved data model 322 to the corresponding data elements 327 of custom data model 332, data elements 326 are automatically removed from reserved data model 322. Reserved data model 322 will therefore shrink and eventually disappear, as bindings to the data elements 326 therein are removed.

The data modeler can remove data elements 326 from reserved data model 322 to create the desired data model that is required by the application. The presentation bindings between presentation fields 318 and data elements 326 are maintained so that data elements 326 can only be removed from reserved data model 322 by substituting a corresponding data element into custom data model 332, and binding presentation fields 318 thereto.

Therefore, as the data modeler changes the data elements 326 bound to presentations fields 318 to be bound to corresponding data elements 327 of custom data model 332, data elements 326 of the automatically generated reserved data model 322 are removed from reserved data model 322 as part of the synchronization. The generation and synchronization processes of the reserved data model 322 therefore never impact custom data model 332. Likewise, the generation and synchronization processes of reserved data model 322 never impact the binding of presentation fields 318 to corresponding data elements 327 within custom data model 332.

Changes to presentation user interface 320 by the graphical designer do not change custom data model 332. When adding a new field, such as presentation fields 318, a new data model element, such as data elements 326, is added to reserved data model 322. If the graphical designer chooses to delete presentation fields 318 from the custom model, data elements 326 bound thereto will also be deleted. Conversely, when the graphical designer deletes presentation fields 318, the data element bound thereto having been previously relocated to custom data model 332, the data element within custom data model 332 is not deleted.

Similarly, if the graphical designer renames one of presentation fields 318 bound to a data element in the reserved data model 322, the corresponding data element in reserved data model 322 will also be renamed. However, if the graphical designer renames one of presentation fields 318 that is bound to a data element in custom data model 332, the data element within custom data model 332 will not be renamed.

Conversely, the data modeler can directly modify custom data model 332, but with the restriction that the binds and references from presentation fields 318 cannot be broken. The data modeler cannot delete data elements 326 if presentation fields 318 are bound to that data element. If data elements 326 are a group of data elements, the data modeler can change which of data elements 326 that the presentation fields 318 are bound to. However, the data modeler must maintain the binding of presentation fields 318 to either data elements 326 of reserved data model 322 or corresponding data elements 327 of custom data model 332.

If a binding from presentation fields 318 to certain data elements 326 is changed to refer to corresponding data elements 327 within custom data model 332, data elements 326 of reserved data model 322 are removed automatically. The data modeler can therefore not add new bindings from presentation fields 318 to data elements 326 in reserved data model 322.

The data modeler is allowed to rename corresponding data elements 327 without renaming the presentation fields 318 bound to corresponding data elements 327. The name synchronization applicable to reserved data model 322 is therefore not applicable to custom data model 332. Name synchronization between presentation fields 318 and data elements 326 is only enforced between presentation fields 318 and reserved data model 322; name synchronization is not enforced between presentation fields 318 and the custom data model 332.

Finally, the data modeler is allowed to change the multiple presentation fields 318 to refer to the same corresponding data elements 327 within custom data model 332. The data modeler is allowed to add new and possibly unused corresponding data elements 327 to custom data model 332. The data modeler therefore has complete control of the design of custom data model 332, within the constraints of the design of the presentation user interface 320.

Figure 4:
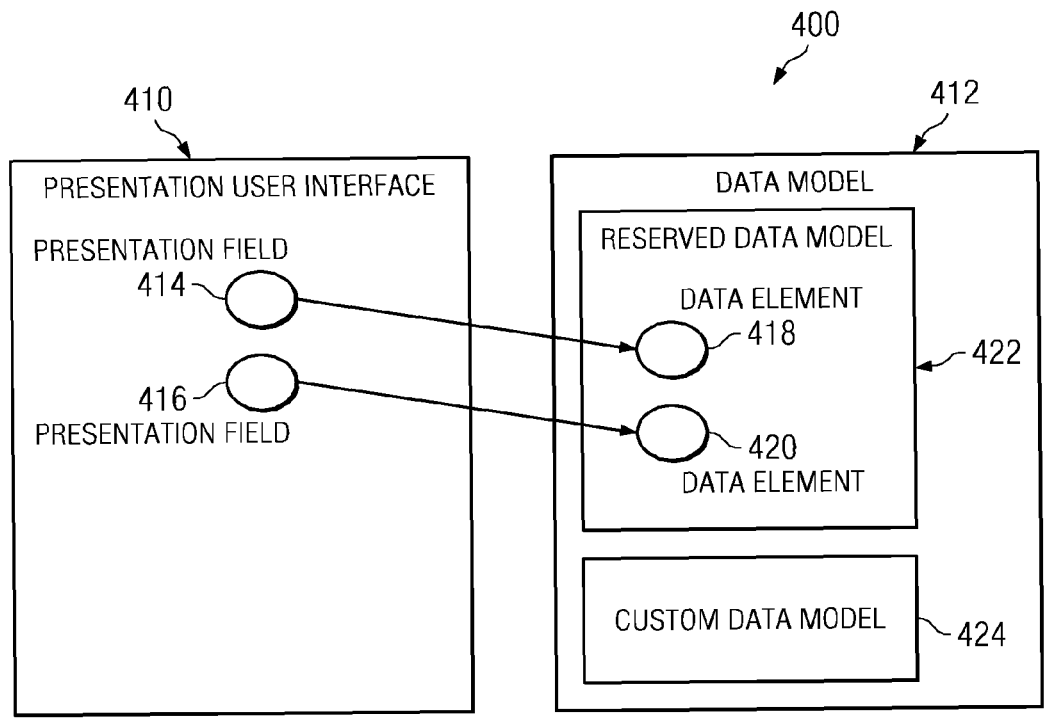
FIG. 4 is a first iteration of a user interface build according to an illustrative embodiment.

Referring now to FIG. 4, a first iteration of a user interface build is shown according to an illustrative embodiment. Presentation user interface 410 can be presentation user interface 320 of FIG. 3. Data model 412 can be data model 324 of FIG. 3.

A graphical designer initially adds presentation field 414 and presentation field 416 to presentation user interface 410. Presentation field 416 and presentation user interface 410 are presentation fields, such as presentation fields 318 of FIG. 3.

Responsive to adding presentation field 414 to presentation user interface 410, data element 418 is generated within reserved data model 422. Similarly, data element 420 is generated within reserved data model 422 responsive to adding presentation field 416 to presentation user interface 410. Reserved data model 422 within the data model 324 is a functional data model that is generated and synchronized. Data element 418 is bound to presentation field 414 and data element 420 is bound to presentation field 416.

Thus, at the end of the graphical designer's work on the first iteration shown in FIG. 4, a complete matching reserved data model 422 has been generated automatically. When the data modeler later views reserved data model 422, the data modeler may find that reserved data model 422 largely meets the needs of the application. The data modeler may then pull reserved data model 422 into custom data model 424, making very few changes to the automatically generated reserved data model 422.

Otherwise, exact requirements for data model 412 may have been provided to the data modeler. In this case, the data modeler can create the required custom data model 424 by changing the presentation field 414 and presentation field 416 from their bindings to corresponding data elements in the reserved data model 422 to be bound to data elements in the custom data model 424. As the data modeler relocates the bindings of data elements from the reserved data model 422 to the data elements of the custom data model 424, reserved data model 422 shrinks, as bindings to the data elements therein are removed.

Figure 5:
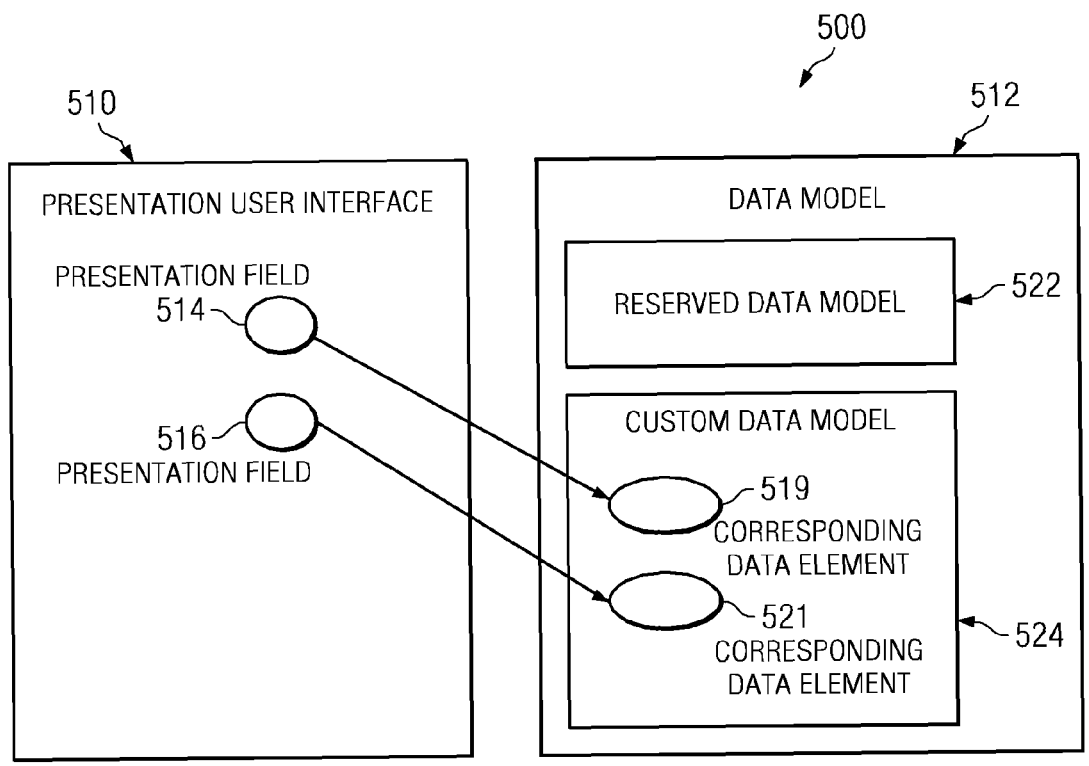
FIG. 5 is a second iteration of a user interface build according to an illustrative embodiment.

Referring now to FIG. 5, a second iteration of a user interface build is shown according to an illustrative embodiment. Presentation user interface 510 is presentation user interface 410 of FIG. 4. Data model 512 is data model 412 of FIG. 4.

A data modeler removes data elements from within reserved data model 522. The data modeler replaces data element, such as data elements 418 and 420 of FIG. 4, with corresponding data element 519 and corresponding data element 521. Corresponding data element 519 and corresponding data element 521 are located in custom data model 524. The data modeler may also provide a more descriptive name for corresponding data element 519 and corresponding data element 521.

The original bindings between presentation field 414 of FIG. 4 to data element 418 of FIG. 4, and from presentation field 416 FIG. 4 to data element 420 FIG. 4 are preserved as those data elements are replaced with corresponding data element 519 and corresponding data element 521 respectively. Thus, presentation field 514 is bound to corresponding data element 519 in custom data model 524. Presentation field 516 is bound to corresponding data element 521 in custom data model 524.

The data modeler removes data element 518 and data element 520 from reserved data model 522 to create the custom data model 524 desired by the data modeler. The presentation bindings are maintained, so data element 518 and data element 520 can only be removed from reserved data model 522 by replacing their use with bindings to corresponding data element 519 and corresponding data element 521 within the custom data model 524.

Figure 6:
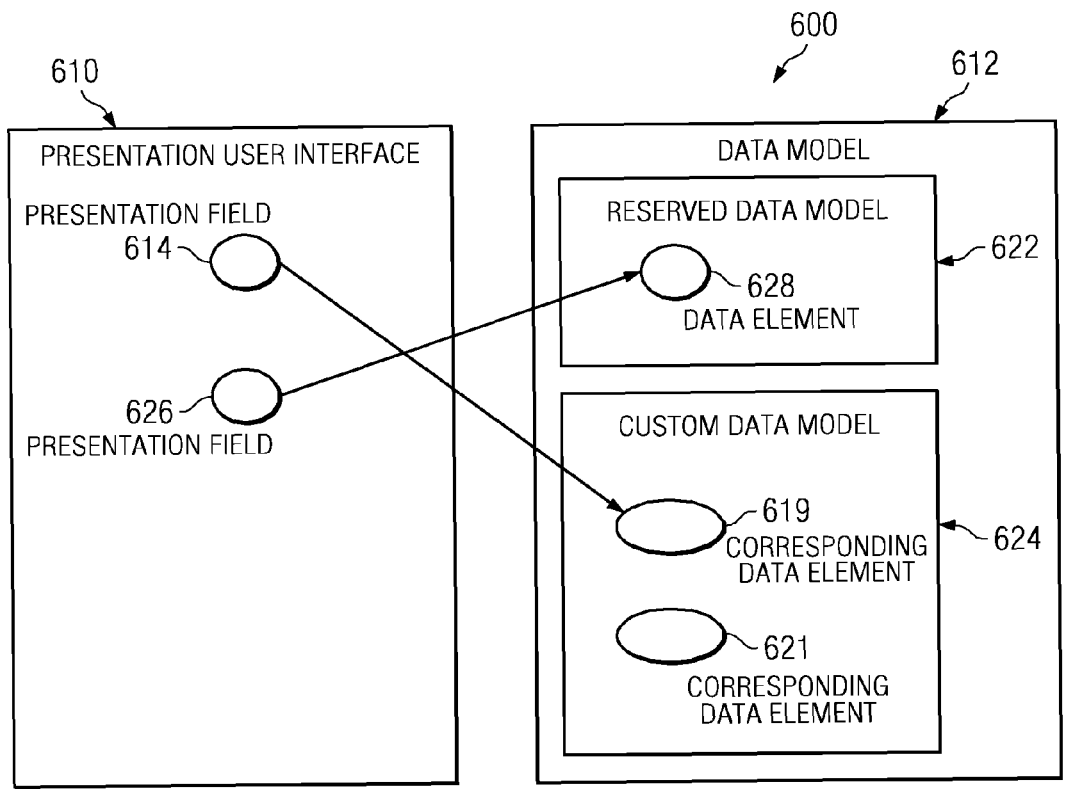
FIG. 6 is a third iteration of a user interface build according to an illustrative embodiment.

Referring now to FIG. 6, a third iteration of a user interface build is shown according to an illustrative embodiment. Presentation user interface 610 is presentation user interface 510 of FIG. 5. Data model 612 is data model 512 of FIG. 5.

In presentation user interface 610, the graphical designer removes presentation field 516 of FIG. 5. The graphical designer adds new presentation field 626 to presentation user interface 610.

Responsive to adding presentation field 626 to presentation user interface 610, data element 628 is generated within reserved data model 622. Data element 628 is then automatically bound to presentation field 626.

Corresponding data element 621 is preserved within custom data model 624. Because the graphical designer does not have access to custom data model 624, data element 621 remains even though the corresponding data field, presentation field 516 of FIG. 5, has been removed.

Changes to presentation user interface 610 by the graphical designer do not change custom data model 624. When adding a new field, such as presentation field 626, a new data model element, data element 628, is added to reserved data model 622. If the graphical designer chooses to delete a presentation field that is bound to the custom model, the data element bound thereto will also be deleted. Conversely, when the graphical designer deletes a field, such as presentation field 516 of FIG. 5, that is bound to a data element of the custom model, such as data element 521 of FIG. 5, the data element of the custom model is not deleted.

Similarly, should the graphical designer rename a presentation field bound to a data element in the reserved model, the corresponding data element in the reserved model will also be renamed. However, if the graphical designer renames a presentation field that is bound to a data element in the custom data model, the data element within the custom data model will not be renamed.

Figure 7:
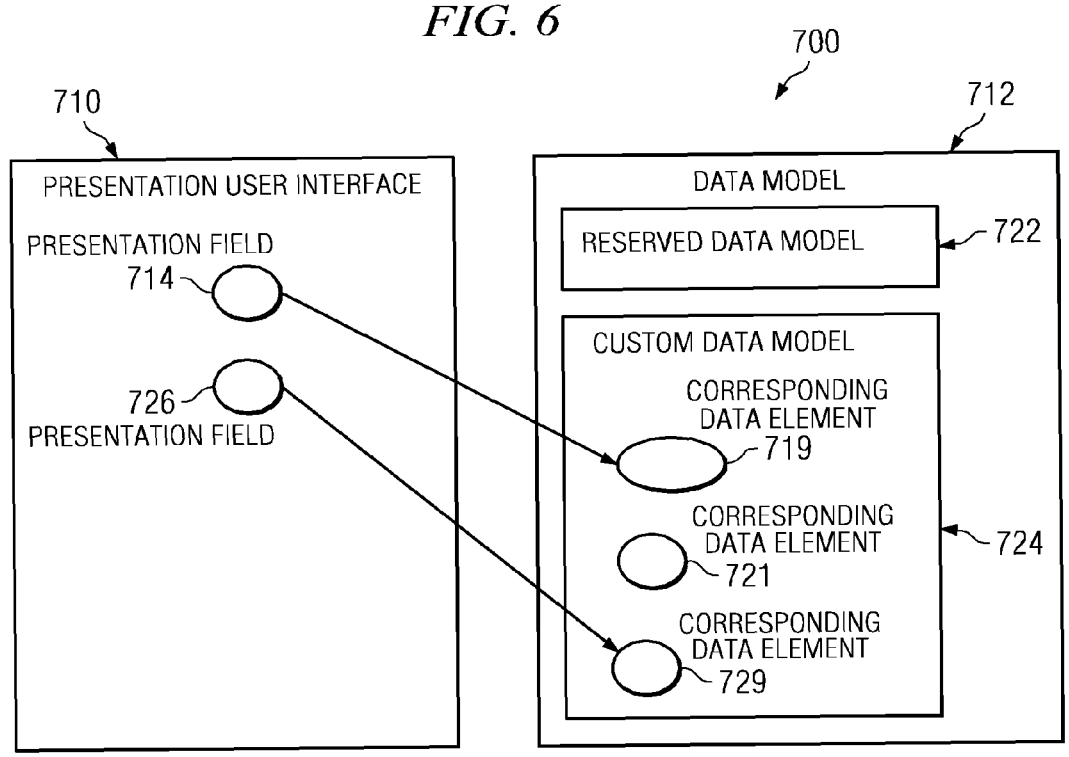
FIG. 7 is a fourth iteration of a user interface build according to an illustrative embodiment.

Referring now to FIG. 7, a fourth iteration of a user interface build is shown according to an illustrative embodiment. Presentation user interface 710 is presentation user interface 610 of FIG. 6. Data model 712 is data model 612 of FIG. 6.

A data modeler has replaced data element 628 of FIG. 6 from within reserved data model 722 with corresponding data element 729 within the custom data model 724. The data modeler has thus relocated data element 628 of FIG. 6 to custom data model 724. The binding created from presentation field 726 to data element 628 of FIG. 6 has been preserved as data element 628 of FIG. 6 is replaced with corresponding data element 729. Thus, presentation field 726 is bound to corresponding data element 729 in custom data model 724.

The data modeler can remove data element 628 of FIG. 6 and from reserved data model 722 to create the custom data model 724 desired by the data modeler. The presentation bindings are maintained, so data element 628 of FIG. 6 can only be removed from reserved data model 722 by replacing their use with bindings to corresponding data element 729 within custom data model 724.

Thus, the data modeler can directly modify custom data model 724, with the restriction that the binds and references from the presentation fields cannot be broken. The data modeler cannot delete a data element if there are still presentation fields that are bound to that data element. The data modeler can change what data elements that the presentation fields are bound to, but must maintain the binding of the presentation field to a data element.

If the binding from a presentation field to a certain data element is changed to refer to the custom model, the element of the reserved model is removed automatically. The data modeler can therefore not add new bindings from the presentation fields to data elements in the reserved model.

The data modeler is allowed to rename the data elements without renaming the presentation fields bound to those data elements. The name synchronization applicable to the graphical designer is therefore not applicable to the data modeler. Name synchronization between presentation fields and data elements is only enforced between the presentation fields and the reserved data model; name synchronization is not enforced between the presentation fields and the custom data model.

Finally, the data modeler is allowed to change the multiple presentation items to refer to the same custom model element. The data modeler is allowed to add new and possibly unused elements to the custom data model. The data modeler therefore has complete control of the design of the custom data model, within the constraints of the design of the presentation user interface.

Figure 8:
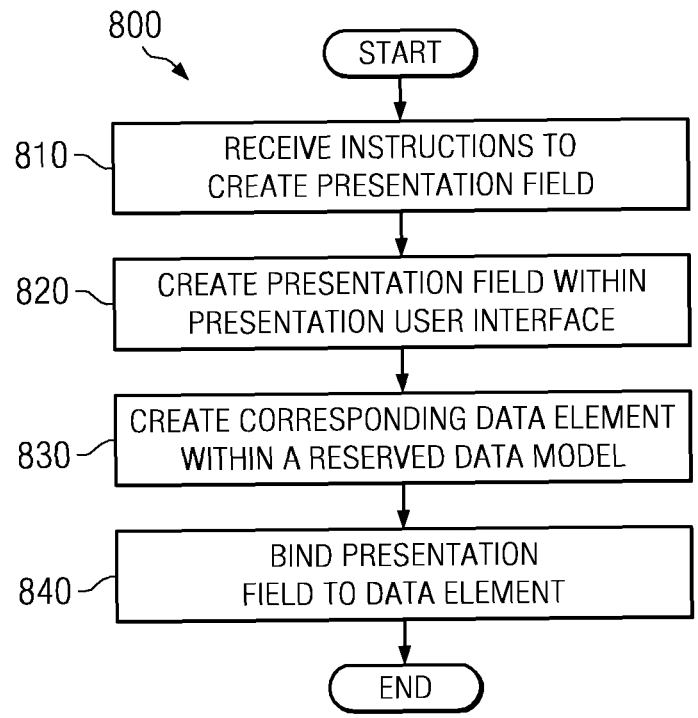
FIG. 8 is a flow chart for creating a new presentation field according to an illustrative embodiment.

Referring now to FIG. 8, a flow chart for creating a new presentation field is shown according to an illustrative embodiment. Process 800 is a software process, executing on a software component, such as user interface builder 312 of FIG. 3.

Process 800 begins by receiving instructions to create a presentation field (step 810). The instructions are computer instructions, or program code, to manipulate the user interface that is being built. The presentation field is a label, field, button, graphics design, or other presentation type item to be placed within the presentation user interface. The presentation field may also include the layout of those items.

Responsive to receiving the instructions, process 800 creates the presentation field within the presentation user interface (step 820). Process 800 performs the instructions, placing or removing appropriate presentation fields within the design and layout of the presentation user interface.

Responsive to creating the presentation field, process 800 creates a corresponding data element within a reserved data model (step 830). The data element is generated and synchronized within the reserved data model.

Responsive to creating corresponding data element within a reserved data model, process 800 binds the data elements to the appropriate presentation field within the presentation user interface (step 840), with the process terminating thereafter. By binding the data elements to appropriate the presentation fields, the user interface builder provides a reference from the appropriate presentation fields to the data elements. The bind specifies from where the presentation fields retrieves data, and to where the presentation fields should store any data input from the user.

Figure 9:
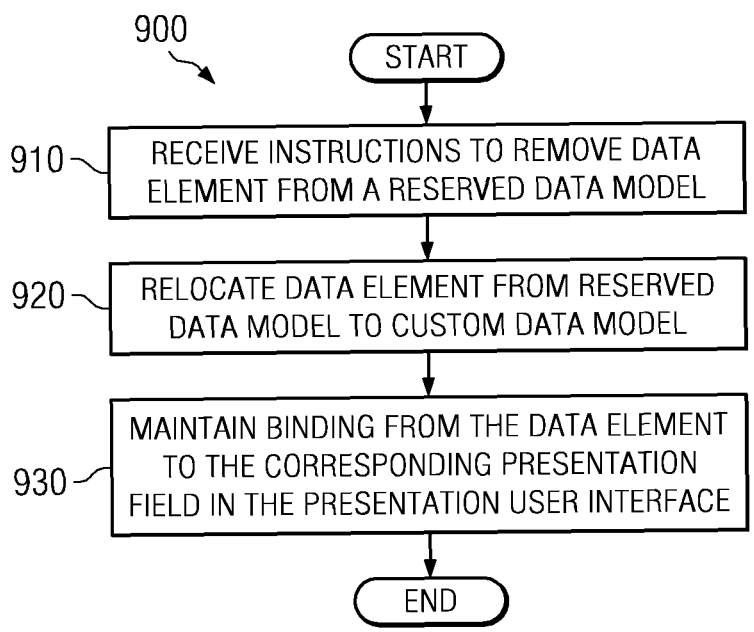
FIG. 9 is a flow chart for manipulating data elements within a data model according to an illustrative embodiment.

Referring now to FIG. 9, a flow chart for manipulating data elements within a data model is shown according to an illustrative embodiment. Process 900 is a software process, executing on a software component, such as user interface builder 312 of FIG. 3.

Process 900 begins by receiving instructions 330 to manipulate a reserved data model (step 910), such as reserved data model 322 of FIG. 3, and data elements therein. By receiving instructions, process 900 enables the data modeler to build the rest of the data model as desired or required, and to make changes to the data model.

Responsive to receiving the instructions, process 900 relocates the manipulated data element from the reserved data model to a custom data model (step 920). As changes are made to the data model, process 900 removes data elements being acted upon by the data modeler from the reserved data model and places those data elements in a custom data model within the data model. The custom data model is a functional data model containing data elements that have been manipulated by the data modeler.

Process 900 maintains the binding from the data element to the corresponding presentation field in the presentation user interface (step 930), with the process terminating thereafter. As the data modeler changes presentations fields to be bound to the custom data model, data elements of the automatically generated reserved data model are removed as part of the synchronization. The generation and synchronization processes of the reserved data model therefore never impact the custom data model. Likewise, the generation and synchronization processes of the reserved data model never impacts the binding of presentation fields to data elements that have been relocated to custom data model.

Thus, the illustrated embodiments describe a process for automatically generating a synchronizing a data model and its binding to the applications presentation, while allowing both the graphical designer and the data modeler to work on the application in iterations. The graphical designer and the data modeler are able to work on the application without negatively impacting each other's work. The illustrated embodiments enable a user interface driven data modeling collaboration between the graphical designer and the data modeler.

A reserved data model is automatically generated and synchronized. The reserved data model is managed separately from the custom data model generated by the data modeler. The data modeler is not permitted to directly edit the reserved data model. The reserved data model is automatically generated by the data processing system simultaneously with graphical design, to ensure that it is always complete and kept synchronized with the presentation of the user interface.

The binding of the presentation to the reserved data model is also automatically generated by the data processing system simultaneously with graphical design. This automatic binding enforces the rule that all presentation items are bound to the data model. The data modeler is able to build the rest of the data model as desired or required, and changes the presentations to be bound to the custom model instead of the automatically generated reserved model. As the data modeler changes the presentations to be bound to the custom model, elements of the automatically generated reserved model are removed as part of the synchronization. The reserved model generation and synchronization processes therefore never impact the custom model or the binding of presentation items to it.

Beyond the mere automatic generation of the reserved model, the illustrative embodiments offer advantages over the human-managed approach of the prior art. In addition to keeping track of binding impacts in the data model due to changes by the graphical designer, the process also ensures that a complete working data model is always available. Furthermore, presentation of the user interface is always fully bound to the working data model. The graphical designer can therefore preview and test the application at any time without waiting for updates and completion from the data modeler.

Furthermore, implementation by the data modeler is no longer invalidated due to changes in the project by the graphical designer. The data modeler is provided with an automatically generated reserved data model that matches both in terms of the number of elements within the user interface, and the names of the elements within the user interface. This generated reserved model can then be used as the starting point for building the exact model desired by the data modeler.

Finally, the data modeler is informed of changes made by the graphical designer. The list of changes is complete and accurate, and is reflected in updates to the data model and binding. Therefore, much of the revisions that the data modeler must implement in response to changes by the graphical designer are performed automatically.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for building a data-bound user interface, the data bound user interface comprising a presentation user interface and a reserved data model, the method comprising:
    receiving a first instruction associated with a presentation user interface;
    responsive to receiving the first instruction, creating a presentation field within the presentation user interface;
    performing synchronization of the reserved data model with the presentation user interface by creating a data element within the reserved data model, wherein the reserved data model is a functional data model, within a data model, generated programmatically by the computer in real time;
    binding the presentation field to the data element as part of the synchronization of the reserved data model; and
    building the data bound user interface, wherein the data bound user interface includes the presentation field and the data element;
    receiving a second instruction;
    responsive to receiving the second instruction, relocating the data element from within the reserved data model to within a custom data model, wherein the custom data model is within the data model and is generated non-programmatically and wherein the data element is removed from the reserved data model; and
    programmatically maintaining the binding from the presentation field to the data element, wherein the synchronization of the reserved data model with the presentation user interface does not impact the data element relocated to the custom model.

2. The computer implemented method of claim 1, further comprising:
    receiving a third instruction;
    responsive to receiving the third instruction, deleting the presentation field within the presentation user interface; and
    deleting the data element within the reserved data model.

3. The computer implemented method of claim 1, wherein the first instruction is a first instruction from a graphical designer.

4. The computer implemented method of claim 1, wherein the second instruction is a second instruction from a data modeler.

5. The computer implemented method of claim 1, wherein the presentation field is selected from the group comprising a label to be placed within the presentation user interface, a field to be placed within the presentation user interface, a button to be placed within the presentation user interface, and a graphics design to be placed within the presentation user interface.

6. The computer implemented method of claim 1, wherein the steps of creating a data element within a reserved data model and binding the presentation field to the data element are performed automatically in response to receiving the first instruction.

7. A computer program product comprising:
    a computer readable non-transitory medium having computer usable program code for building a data-bound user interface, the data bound user interface comprising a presentation user interface and a reserved data model, the computer program product comprising:
    computer usable program code for receiving a first instruction associated with a presentation user interface;
    computer usable program code, responsive to receiving the first instruction, for creating a presentation field within the presentation user interface;
    computer usable program code for performing synchronization of the reserved data model with the presentation user interface by creating a data element within the reserved data model, wherein the reserved data model is a functional data model, within a data model, generated programmatically by the computer in real time;
    computer usable program code for binding the presentation field to the data element as part of the synchronization of the reserved data model;
    computer usable program code for building the data bound user interface, wherein the data bound user interface includes the presentation field and the data element;
    computer usable program code for receiving a second instruction;
    computer usable program code, responsive to receiving the second instruction, for relocating the data element from within the reserved data model to within a custom data model, wherein the custom data model is within the data model and generated non-programmatically and wherein the data element is removed from the reserved data model as part of the synchronization of the reserved data model; and
    computer usable program code for programmatically maintaining the binding from the presentation field to the data element wherein the synchronization of the reserved data model with the presentation user interface does not impact the data element relocated to the custom model.

8. The computer program product of claim 7, further comprising:
computer usable program code for receiving a second instruction;
computer usable program code, responsive to receiving the second instruction, for deleting the presentation field within the presentation user interface; and
computer usable program code for deleting the data element within the reserved data model.

9. The computer program product of claim 7, wherein the first instruction is a first instruction from a graphical designer.

10. The computer program product of claim 7, wherein the second instruction is a second instruction from a data modeler.

11. The computer program product of claim 7, wherein the presentation field is selected from the group comprising a label to be placed within the presentation user interface, a field to be placed within the presentation user interface, a button to be placed within the presentation user interface, and a graphics design to be placed within the presentation user interface.

12. The computer program product of claim 7, wherein the computer usable program code for creating a data element within a reserved data model and the computer usable program code for binding the presentation field to the data element are performed automatically in response to receiving the first instruction.

13. A computer implemented method for building a data-bound user interface, the data bound user interface comprising a presentation user interface and a reserved data model, the method comprising:
providing a presentation user interface and a data model, the data model comprising a reserved data model and a custom data model, wherein the reserved data model is a functional data model, within the data model, generated programmatically by the computer in real time;
allowing a graphical designer access to the presentation user interface to add a presentation field to the presentation user interface, wherein a data element is automatically generated within the reserved data model in response to the graphical designer adding the presentation field, performing synchronization of the reserved data model with the presentation user interface;
binding the presentation field to the data element within the reserved data model to form a bind as part of synchronization of the reserved data model;
allowing a data modeler access to the reserved data model to relocate the data element from the reserved data model to the custom data model wherein the custom data model is within the data model and generated non-programmatically; and
responsive to the data modeler relocating the data element from the reserved data model to the custom data model, programmatically maintaining the bind between the presentation field and the data element relocated to the custom data model as part of the synchronization of the reserved data model, wherein the synchronization of the reserved data model with the presentation user interface does not impact the data element relocated to the custom model;
wherein the graphical designer cannot modify the data element once the data element is relocated to the custom data model, and wherein the data modeler only has access to the reserved data model to relocate the data element to the custom data model.

14. The computer implemented method of claim 13 further comprising:
allowing a graphical designer access to the presentation user interface to delete the presentation field from the presentation user interface.

15. The computer implemented method of claim 14 further comprising:
responsive to the graphical designer deleting the presentation field, deleting the data element only if the data element is within the reserved data model.

16. The computer implemented method of claim 14 further comprising:
responsive to the graphical designer deleting the presentation field, retaining the data element if the data element is within the custom data model.

17. The computer implemented method of claim 13, wherein the presentation field is selected from the group comprising a label to be placed within the presentation user interface, a field to be placed within the presentation user interface, a button to be placed within the presentation user interface, and a graphics design to be placed within the presentation user interface.

18. The computer implemented method of claim 13, wherein the steps of creating a data element within a reserved data model and binding the presentation field to the data element are performed automatically in response to the graphical designer adding a presentation field to the presentation user interface.

* * * * *